(12) United States Patent
Saleh et al.

(10) Patent No.: US 7,764,596 B2
(45) Date of Patent: Jul. 27, 2010

(54) METHOD FOR RESTORING A VIRTUAL PATH IN AN OPTICAL NETWORK USING DYNAMIC UNICAST

(75) Inventors: Ali Najib Saleh, Ft. Lauderdale, FL (US); H. Michael Zadikian, McKinney, TX (US); Zareh Baghdasarian, La Canada, CA (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 09/891,022

(22) Filed: Jun. 25, 2001

(65) Prior Publication Data

US 2003/0179701 A1    Sep. 25, 2003

Related U.S. Application Data

(63) Continuation-in-part of application No. 09/858,743, filed on May 16, 2001, now Pat. No. 7,352,692.

(51) Int. Cl.
*H04L 12/26* (2006.01)

(52) U.S. Cl. ................................ 370/216; 370/228

(58) Field of Classification Search ................. 370/216, 370/218, 228
See application file for complete search history.

(56) References Cited

U.S. PATENT DOCUMENTS

| | | | | |
|---|---|---|---|---|
| 4,287,592 A | * | 9/1981 | Paulish et al. ................ | 370/403 |
| 5,049,871 A | | 9/1991 | Sturgis et al. ................ | 370/224 |
| 5,093,824 A | | 3/1992 | Coan et al. .................... | 370/16 |
| 5,130,974 A | * | 7/1992 | Kawamura et al. ............ | 370/217 |
| 5,412,376 A | | 5/1995 | Chujo et al. .................. | 340/825.1 |
| 5,548,639 A | | 8/1996 | Ogura et al. ................. | 379/221.04 |
| 5,590,118 A | | 12/1996 | Nederlof ..................... | 370/218 |
| 5,596,722 A | | 1/1997 | Rahnema .................... | 395/200 |
| 5,646,936 A | | 7/1997 | Shah et al. ................... | 370/228 |
| 5,687,167 A | | 11/1997 | Bertin et al. ................. | 370/254 |
| 5,737,319 A | | 4/1998 | Croslin et al. ............... | 370/255 |
| 5,781,528 A | | 7/1998 | Sato et al. ................... | 370/218 |
| 5,805,578 A | | 9/1998 | Stirpe et al. ................. | 370/255 |

(Continued)

FOREIGN PATENT DOCUMENTS

EP     0 781 068 A1     6/1997

(Continued)

OTHER PUBLICATIONS

P.A. Veitch, et al., "A distributed protocol for fast and robust virtual path restoration", IEE, 1995.*

(Continued)

*Primary Examiner*—Hong Cho
(74) *Attorney, Agent, or Firm*—Campbell Stephenson LLP

(57) ABSTRACT

A method for restoring a virtual path, provisioned between a source and a target node, in a mesh optical network is described. The method, in one embodiment, forwards a resource request in the network to identify an alternate route. Each node identifies and allocates resources for failed virtual path and the virtual path is provisioned using these resources. The constant update of nodal topology by each node may provide a fast identification of nodes with required bandwidth for failed virtual path.

123 Claims, 8 Drawing Sheets

U.S. PATENT DOCUMENTS

| | | | | |
|---|---|---|---|---|
| 5,805,593 | A | 9/1998 | Busche | 370/396 |
| 5,835,696 | A | 11/1998 | Hess | 395/182.08 |
| 5,881,048 | A | 3/1999 | Croslin | 370/228 |
| 5,881,246 | A | 3/1999 | Crawley et al. | 709/238 |
| 5,884,297 | A | 3/1999 | Noven | 707/1 |
| 5,887,127 | A | 3/1999 | Saito et al. | 714/4 |
| 5,920,257 | A | 7/1999 | Commerford | 340/506 |
| 5,933,422 | A | 8/1999 | Kusano et al. | 370/331 |
| 5,933,425 | A | 8/1999 | Iwata | 370/351 |
| 5,959,972 | A | 9/1999 | Hamami | 370/228 |
| 5,974,045 | A * | 10/1999 | Ohkura et al. | 370/241.1 |
| 5,987,526 | A | 11/1999 | Morales | 709/249 |
| 5,995,503 | A | 11/1999 | Crawley et al. | 370/351 |
| 5,999,286 | A | 12/1999 | Venkatesan | 359/117 |
| 6,011,780 | A | 1/2000 | Vaman et al. | 370/237 |
| 6,026,077 | A * | 2/2000 | Iwata | 370/254 |
| 6,041,037 | A | 3/2000 | Nishio et al. | 370/228 |
| 6,041,049 | A | 3/2000 | Brady | 370/351 |
| 6,047,331 | A | 4/2000 | Medard et al. | 709/239 |
| 6,075,766 | A | 6/2000 | Croslin | 370/225 |
| 6,075,775 | A | 6/2000 | Ueki | 370/248 |
| 6,097,696 | A | 8/2000 | Doverspike | 370/216 |
| 6,097,722 | A | 8/2000 | Graham et al. | 370/395 |
| 6,101,167 | A | 8/2000 | Shimada | 370/225 |
| 6,115,753 | A | 9/2000 | Joens | 709/242 |
| 6,130,876 | A | 10/2000 | Chaudhuri | 370/228 |
| 6,130,881 | A | 10/2000 | Stiller et al. | 370/238 |
| 6,134,671 | A | 10/2000 | Commerford et al. | 714/4 |
| 6,148,000 | A | 11/2000 | Feldman et al. | 370/397 |
| 6,154,778 | A | 11/2000 | Koistinen et al. | 709/228 |
| 6,222,653 | B1 | 4/2001 | Asahi | 359/110 |
| 6,259,673 | B1 | 7/2001 | Yoshihara et al. | 370/238 |
| 6,259,679 | B1 | 7/2001 | Henderson et al. | 370/254 |
| 6,272,107 | B1 | 8/2001 | Rochberger et al. | 370/216 |
| 6,275,492 | B1 | 8/2001 | Zhang | 370/392 |
| 6,282,170 | B1 * | 8/2001 | Bentall et al. | 370/225 |
| 6,292,464 | B1 * | 9/2001 | Elahmadi et al. | 370/223 |
| 6,301,244 | B1 | 10/2001 | Huang et al. | 370/351 |
| 6,304,549 | B1 | 10/2001 | Srinivasan et al. | 370/230 |
| 6,324,162 | B1 | 11/2001 | Chaudhuri | 370/225 |
| 6,347,078 | B1 | 2/2002 | Narvaez-Guarnieri et al. | 370/230 |
| 6,359,857 | B1 * | 3/2002 | Ahmad et al. | 370/217 |
| 6,370,119 | B1 | 4/2002 | Basso et al. | 370/252 |
| 6,400,681 | B1 | 6/2002 | Bertin et al. | 370/218 |
| 6,430,150 | B1 * | 8/2002 | Azuma et al. | 370/218 |
| 6,442,131 | B1 * | 8/2002 | Kondo | 370/218 |
| 6,457,050 | B1 | 9/2002 | Cowan et al. | 709/224 |
| 6,463,062 | B1 | 10/2002 | Buyukkoc et al. | 370/395.1 |
| 6,504,845 | B1 | 1/2003 | Petersen et al. | 370/412 |
| 6,577,595 | B1 * | 6/2003 | Counterman | 370/230 |
| 6,600,719 | B1 * | 7/2003 | Chaudhuri | 370/228 |
| 6,643,254 | B1 | 11/2003 | Kajitani et al. | 370/217 |
| 6,718,480 | B1 | 4/2004 | Ogura et al. | 714/4 |
| 6,728,205 | B1 * | 4/2004 | Finn et al. | 370/217 |
| 6,801,504 | B1 * | 10/2004 | Ito | 370/242 |
| 6,856,594 | B1 * | 2/2005 | Aihara et al. | 370/228 |
| 2002/0118636 | A1 * | 8/2002 | Phelps et al. | 370/222 |
| 2002/0118638 | A1 * | 8/2002 | Donahue et al. | 370/229 |

FOREIGN PATENT DOCUMENTS

| | | |
|---|---|---|
| EP | 0 841 824 A2 | 5/1998 |

OTHER PUBLICATIONS

Hae-Goo Song et al., "Dynamic rerouting for ATM virtual path restoration", IEEE, 1997.*

Chao-Ju Hou, "Design of a fast restoration mechanism for virtual path-based ATM networks", IEEE, 1997.*

Hideki Sakauchi, et al., "A Self-Healing Network With an Economical Spare-Channel Assignment", Proceedings of the Globecom '90 IEEE Telecommunications Conference & Exhibition, vol. 1, 1991, pp. 438-443.

Baruch Awerbuch, et al., "Distributed Controls for Paris", Proc. Annual ACM Symp. On Principles of Distributed Computing, Aug. 22, 1999, pp. 145-159.

Sujai Hajela, "HP OEMF: Alarm Management in Telecommunications Networks", *Hewlett Packard Journal*, Oct. 1996, vol. 47, No. 5, pp. 22-30.

Ali Saleh, H. Michael Zadikian, Zareh Baghdasarian, Vahid Parsi , "A Method for Routing Information Over a Network", filed Jan. 15, 1999, U.S. Appl. No. 09/232,397.

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali Saleh, "A Method for Path Selection in a Network", filed Jan. 4, 2000; U.S. Appl. No. 09/478,235.

Ali N. Saleh and Stevan E. Plote, "A Network Addressing Scheme for Reducing Protocol Overhead in an Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method and Apparatus for a Rearrangeably Non-Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol for a Configurable Network Router", filed Jan. 4, 2000; U.S. Appl. No. 60/174,323.

Ronald Alan Russell and Michael Kevin Anthony, "A Method and Apparatus for Isolating Faults in a Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

The ATM Forum Technical Committee, "Interim Inter-switch Signaling Protocol (IISP) Specification v1.0", af-pnni-0026.000, Dec. 1994, pp. 1-34.

The ATM Forum Technical Committee, Private Network-Network Interface Specification Version 1.0 (PNNI 1.0), afpnni-0055.000, Mar. 1996, pp. v-xviii, pp. 19, 1-366.

The ATM Forum Technical Committee, Private Network-Network Interface Specification Version 1.0 Addendum (Soft PVC MIB), af-pnni-0066.000, Sep. 1996.

The ATM Forum Technical Committee, Addendum to PNNI V1.0 for ABR parameter negotiation, af-pnni-0075.000, Jan. 1997, pp. 2-3.

The ATM Forum Technical Committee, PNNI V1.0 Errata and PICS, af-pnni-0081.000, May 1997, pp. 2-224.

J. Moy, "OSPF Version 2", Ascend Communications, Inc., Apr. 1998.

K. Murakami, et al., "A MAPOS version 1 Extension—Node-Switch Protocol", NTT Laboratories, Jun. 1997.

F. Baker, et al., "OSPF Version 2 Management Information Base", Nov. 1995.

F. Baker, et al., "PPP Bridging Control Protocol (BCP)", Jun. 1994.

E. Decker et al., "Definitions of Managed Objects for Bridges", Jul. 1993.

* cited by examiner

METHOD FOR RESTORING A VIRTUAL PATH IN AN OPTICAL NETWORK USING DYNAMIC UNICAST

CROSS-REFERENCES TO RELATED APPLICATIONS

This application is a continuation-in-part of patent application Ser. No. 09/858,743, filed May 16, 2001 now U.S. Pat. No. 7,352,692 and entitled "A Resource Reservation Scheme For Path Restoration In An Optical Network," having A. N. Saleh, H. M. Zadikian, Z. Baghdasarian, and V. Parsi as inventors. This application is assigned to Cisco Technology, Inc the assignee of the present invention, and is hereby incorporated by reference, in its entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

SUMMARY

In one embodiment of the present invention, a method is described for restoring a virtual path in an optical network. The method includes identifying one or more nodes with resources, wherein the nodes with resources are ones of the nodes having a resource necessary to support the virtual path, determining an alternate physical path, the alternate physical path includes the nodes with resources, and restoring the virtual path using the alternate physical path. The restoring is done by configuring the alternate physical path by establishing a communication connection between the nodes with resources and provisioning the virtual path over the alternate physical path.

In another embodiment, the method includes detecting a failure in the virtual path wherein the failure is detected by receiving a failure message packet.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

A network can employ various restoration schemes to restore a virtual path (VP) in case of a failure. To guarantee the restoration of a VP in, each VP is assigned a restoration priority level. The restoration priority level determines a VP's relative priority with regard to restoration in the event of a failure within the network. The present invention provides a method of restoring a virtual path using dynamic unicast. In such a dynamic unicast method, a VP is assigned a single path when provisioned. The restoration of the VP is guaranteed. The VP is restored by creating a new physical path and provisioning the virtual path on the new physical path.

Network Configuration

Figure 1:
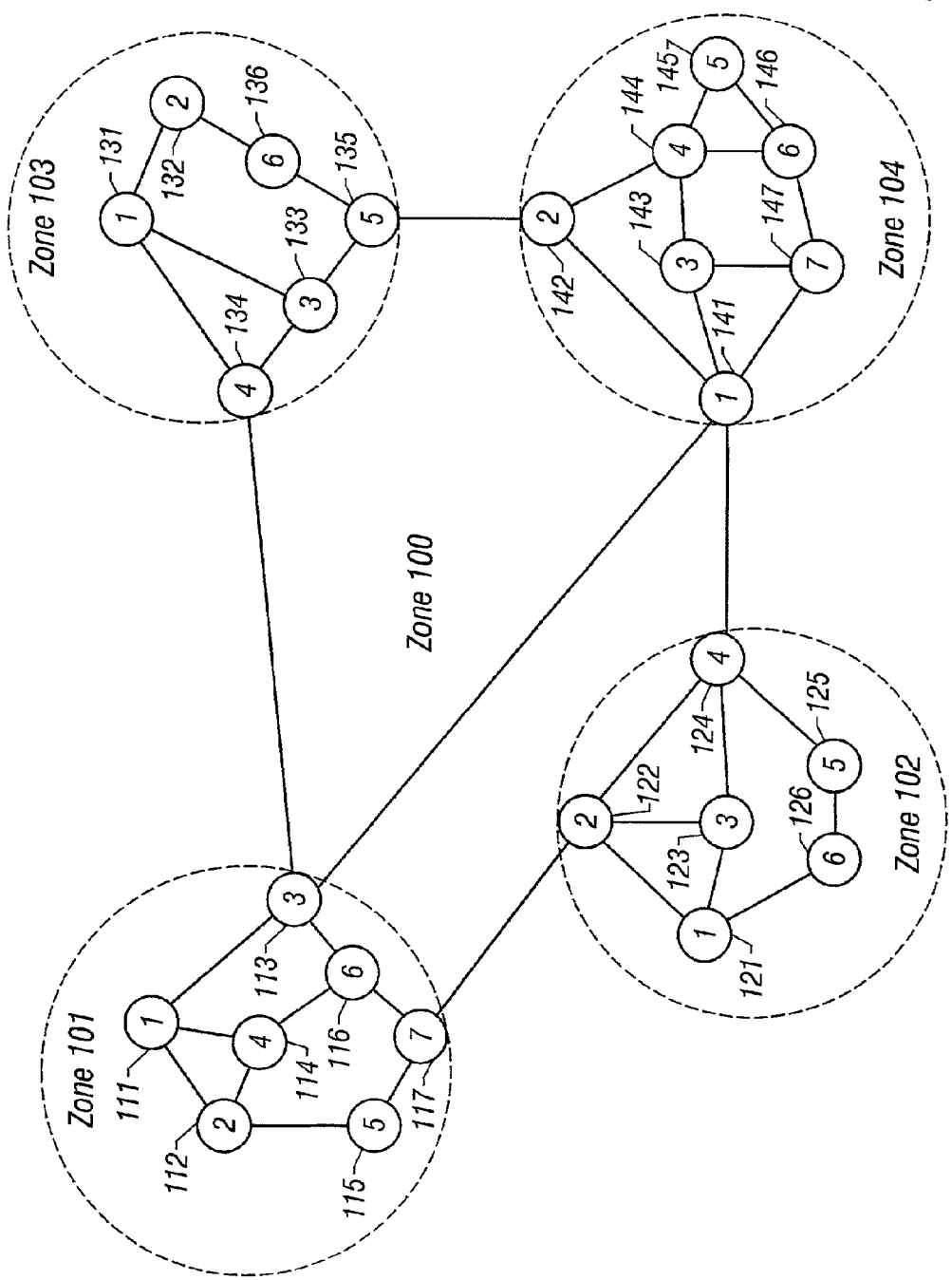
FIG. 1 is a block diagram of a zoned network.

FIG. 1 illustrates an exemplary zoned mesh network. The network can be configured in a non-zoned network in which network nodes are coupled in a mesh topology. The exemplary zoned mesh network of FIG. 1 has been organized into a backbone, zone 100, and four configured zones, zones 101-

104. The solid circles in each zone represent network nodes, while the numbers within the circles represent node addresses, and include network nodes 111-117, 121-126, 131-136, and 141-147. The dashed circles represent network zones. The network depicted in FIG. 1 has four configured zones (zones 101-104 (addressed as zone 1-4) and one backbone (zone 100). Network nodes 113, 117, 122, 124, 134, 135, 141, and 142, are boundary or proxy nodes because they connect to more than one zone. All other nodes are interior nodes because their links attach only to nodes within the same zone. However, the exemplary network of FIG. 1 can be configured as non-zoned mesh network. In a non-zoned mesh network, nodes are combined into one network with no boundary or proxy node.

Provisioning of Network Nodes

Once a mesh network topology has been defined (e.g., the zoned topology of FIG. 1), the user can configure one or more end-to-end connections that can span multiple nodes or zones, an operation is referred to herein as provisioning. For each virtual path to be provisioned, a physical path must be selected and configured. Each set of physical connections that are provisioned creates an end-to-end connection between the two end nodes that supports a virtual point-to-point link (referred to herein as a virtual path or VP). The resulting VP has an associated capacity and an operational state, among other attributes.

In a network, VPs may be provisioned statically or dynamically. For example, a user can identify the nodes that will comprise the virtual path and manually configure each node to support the given virtual path. The selection of nodes may be based on any number of criteria, such as Quality of Service (QoS), latency, cost, distance traveled in the network and the like. Alternatively, the VP may be provisioned dynamically using any one of a number of methods. The provisioning information may then be forwarded to all the nodes in the network to store information in node's network topology database. Each node periodically updates this information to efficiently maintain resources and in case of path failure, effectively allocate appropriate resources needed for specific virtual path for path restoration. The method of routing information in such networks is described in a commonly-assigned U.S. patent application Ser. No. 09/232,395, entitled "A Configurable Network Router," filed Jan. 15, 1999, which is hereby incorporated by reference, in its entirety and for all purposes.

The end nodes of a VP can be configured to have a master/slave relationship. The terms source and destination are also used herein in referring to the two end-nodes. In such a relationship, the node with a numerically lower node ID typically assumes the role of the master (or source) node, while the other assumes the role of the slave (or destination) node, although the opposite arrangement is also acceptable. An intermediate node is referred to herein as tandem node. Typically, the source node assumes the provisioning responsibilities and the destination node simply waits for a message from the source node informing the destination node of the VP's new physical path (although again, this need not necessary be the case). This information includes node identifiers of tandem nodes, if any, within the path. In a zoned mesh topology, if a virtual path spans over multiple zones, the border node or proxy node of each zone acts as source node for their particular zone. As will be apparent to one of skill in the art, the opposite convention or another paradigm can easily be employed.

Typically, during provisioning, each VP is assigned a performance and restoration priority level. The priority, referred to herein as Class of Service (CoS), determines VP's relative priority for performance within the network and restoration in the event of a failure within the network. The method of assigning CoS to a VP is described in commonly-assigned U.S. patent application Ser. No. 09/858,743, filed on May 16, 2001, entitled "A Resource Reservation Scheme for Path Restoration in an Optical Network," which is hereby incorporated by reference, in its entirety and for all purposes. In case of a VP failure at a node in the network, the node determines how to restore the VP based on the CoS assigned to the VP. The assigned CoS defines the restoration method used by the node to restore failed VP.

Failure Detection, Propagation, and Path Restoration

Failure Detection and Propagation

In networks, failures are typically detected using the mechanisms provided by the underlying physical network. The failure detection mechanism in a mesh optical network is described in commonly-assigned U.S. patent application Ser. No. 09/232,397, filed Jan. 15, 1999 and entitled "A Method For Routing Information Over A Network," which is hereby incorporated by reference, in its entirety and for all purposes.

Path Restoration Using Dynamic Unicast Method

If the CoS of a VP defines dynamic unicast as the method of restoration for that VP, then the restoration is guaranteed but the restoration time can be longer than what might be needed for critical path traffic such as a voice call. The "restoration time guarantees" for a VP using dynamic unicast method depend on the network configuration and provisioning attributes (e.g., bandwidth requirement, QoS, latency and the like) of the VP. In a zoned network topology, the dynamic unicast restoration method is generally used to restore intrazone path failures. Preferably, the source node of failed VP initiates the dynamic unicast restoration process. The tandem node that discovers the path failure, initiates a path failure notification for the source node and waits for a response. The destination node preferably responds to restoration process initiated by the source node.

Initiating Restoration

Once a node other than the source node detects a path failure, the node initiates a path restoration request for the source node of failed VP using a Restore_I request. The method of generating Restore_I requests and responses is described in commonly-assigned U.S. patent application Ser. No. 09/750,668, entitled "A Virtual Path Restoration Scheme Using Fast Dynamic Mesh Restoration in an Optical Network", filed on Dec. 29, 2000 and is hereby incorporated by reference in its entirety and for all purposes.

When the source node receives a Restore_I request, the source node determines the type of restoration scheme assigned to the failed VP. Upon determining that the failed VP is to use the dynamic unicast restoration scheme, the source node creates an Add Path Request packet with appropriate contents and transmits the request to other nodes in the network.

Add Path Request Packet

Figure 2:
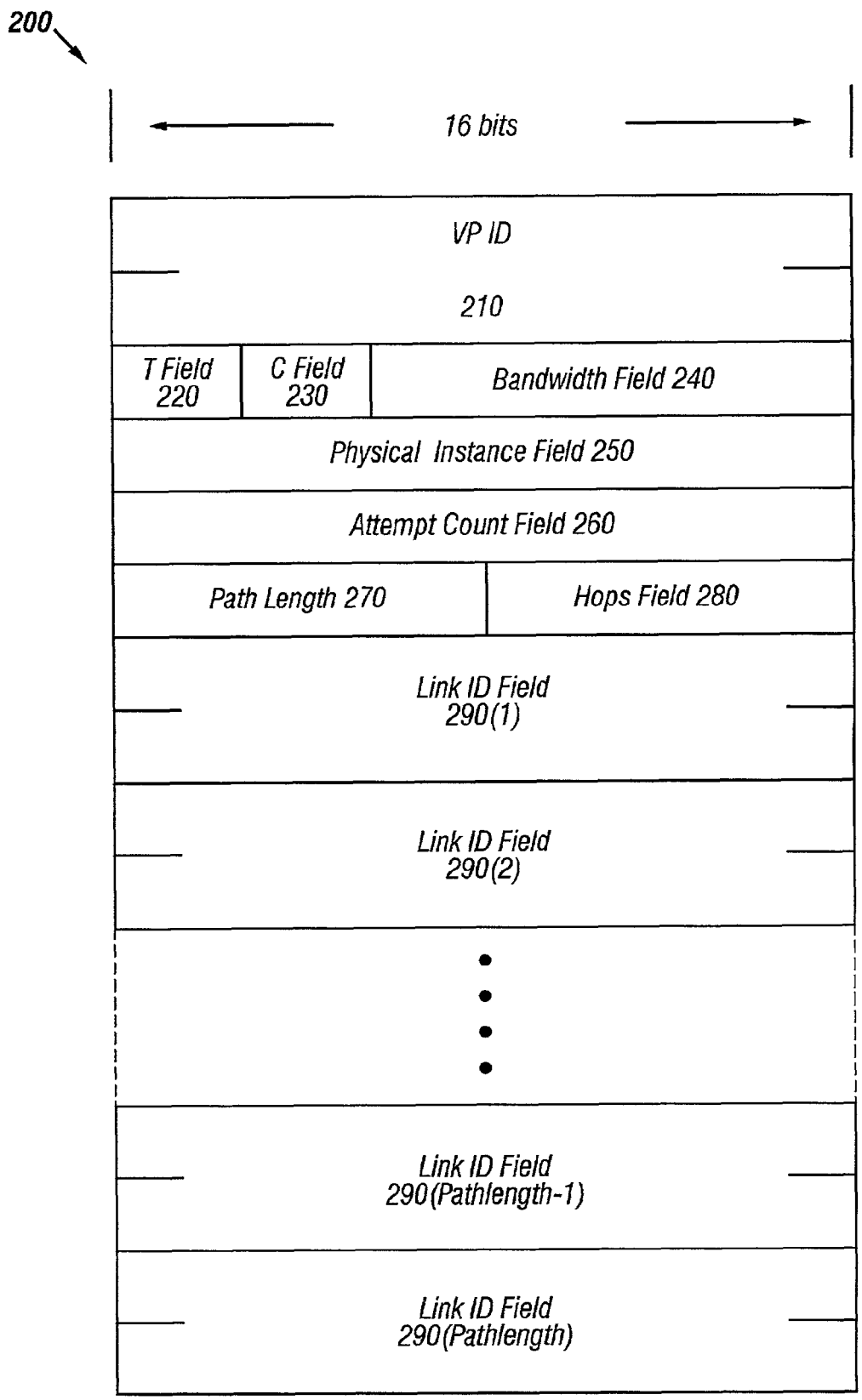
FIG. 2 illustrates an example of Add Path Request packet.

FIG. 2 illustrates an example of an Add Path Request (APR) packet 200. APR packet 200 is also used to provision a new path for a VP. APR packet 200 includes a VP-ID 210, the 32 bit ID of the VP. It will be apparent to one of the skill in the art that, while specific lengths are described, the fields discussed here may be of any appropriate length. A 2-bit long 'T' field 220 is used to indicate the type of path. This field indicates whether the path is primary path or secondary path for a CoS 3 VP. A 2-bit long 'C' field 230 defines the restoration Class of Service. A 12-bit long bandwidth field 240 indicates the bandwidth requested for the VP for example, in STS-48 granularity.

A physical instance field 250 stores a 16-bit physical instance identifier for the VP. The source node of the VP maintains physical instance field 250, which is associated with the path (i.e., set of link IDs) of the VP and is part of APR packet 200 and all restoration-related packets. Preferably, the source node updates physical instance field 250. The first path of a VP that is successfully provisioned (as seen by the source node) has a physical instance identifier of 1. All future path messages should have the correct value of this identifier. If a new path is selected for the VP, the physical instance identifier is incremented (e.g., by 1) by the source node. Due to the distributed nature of path selection and multiple failures, several physical instances of the same VP may temporarily exist in the network at any given time. However, only one instance ultimately survives.

An attempt count field 260 is the attempt count of the current physical instance of the VP. The source node increments this field every time the source node resends the same request. Since APR packets are retransmitted periodically, different attempts preferably should be distinguished from one another. Attempt count field 260 allows retransmitted requests to be distinguished from one another. Attempt count field 260 starts at a given point (e.g., from 1) and is incremented (e.g., by 1) with each retransmission. Because given APR packets may traverse different paths to get to the same intermediate node, attempt count field 260 allows the intermediate node to differentiate among multiple request attempts for restoration of the same physical instance of the same VP.

A path length field 270 indicates the number of links in the VP. Path length field 270 determines the number of link identifications that appear at the end of the packet. A hops field 280 indicates the number of hops traversed by a given APR packet. Hops field 280 is incremented (e.g., by 1) at each receiving node in the given APR packet. During the transmission of the given APR packet, the value of hops field 280 is incremented (e.g., from 0 to (Path Length−1)). Upon the return of a response, hops field 280 is decremented (e.g., by 1) by each node that forwards the response to the source node. During the transmission of a response, the value of hops field 280 is decremented from the maximum number of hops traversed to zero by the time the response reaches the source node (e.g., from (Path Length−1) to 0). A link ID field 290 is a 32-bit long field for the link IDs of the VP. The number of link IDs depends upon the path length set by the source node.

Upon sending APR packet 200, the source node sets a timer. If a positive response is not received before the timer expires, the source node generates another APR packet. Each time the APR packet is generated, attempt count field 260 is incremented (e.g., by 1). The APR packets are preferably generated for only a certain number of times, after which the source node generates a network alarm.

Receiving an Add Path Request Packet at a Tandem Node

Figure 3:
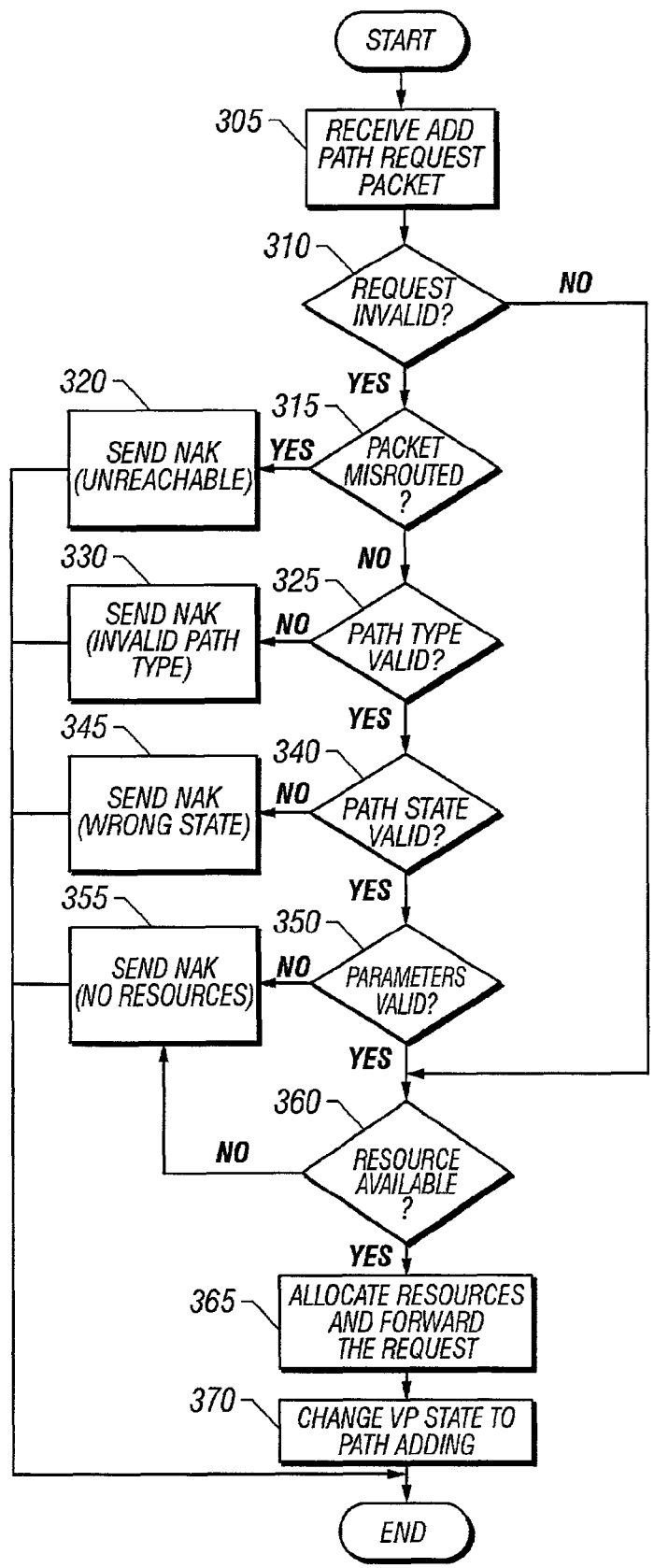
FIG. 3 illustrates a flow chart of steps performed by a tandem node when processing an Add Path Request.

FIG. 3 is a flow chart illustrating the actions performed by a tandem node upon receipt of an APR packet. Initially, the tandem node receives an APR packet (step 305). The tandem node first determines if the request is invalid and contains any error (step 310). If the request is valid, the node proceeds with resource checking (step 360). Otherwise, the process makes at lease one of several determinations as to the reason for the request's invalidity. The tandem node determines if the APR packet is misrouted (i.e., there is no path to the destination, or the tandem node does not recognize any of the link IDs in the list due to an incomplete network topology update) (step 315). If the APR packet is misrouted, the tandem node returns a NAK (UNREACHABLE) upstream (step 320). If the APR packet is not misrouted, the tandem node determines if the path type field in the APR packet is invalid (step 325). If the path type field is invalid, the tandem node responds with a NAK (INVALID PATH TYPE) (step 330). If the path type field is valid, the tandem node determines if the APR packet is an unexpected request (i.e., the request arrives while the path is in restoring or deleting states) (step 340). If the APR packet is an unexpected request, the tandem node responds with a NAK (WRONG STATE) (step 345). If the APR packet is not unexpected, the tandem node determines if one or more of the parameters of the APR packet (such as the CoS, origin, target or bandwidth fields) are invalid (step 350). If one or more of the parameters of the APR packet are invalid, the tandem node returns a NAK (NO RESOURCES) to the source node (step 355).

If the APR packet is valid and no errors are found, the tandem node determines if sufficient resources are available to support the virtual path (step 360). If there are insufficient resources (such as memory, bandwidth on input and/or output links, unavailability of ports and the like), the tandem node responds with a NAK (NO RESOURCES) (step 355). However, if sufficient resources are available, the tandem node makes bandwidth reservations on input and output links, increments the hops field in the APR packet and forwards the request to the next appropriate link (step 365). The tandem node sets the path-state to 'path adding' and waits for response from the next link (step 370).

Receiving an Add Path Request Packet at a Destination Node

Figure 4:
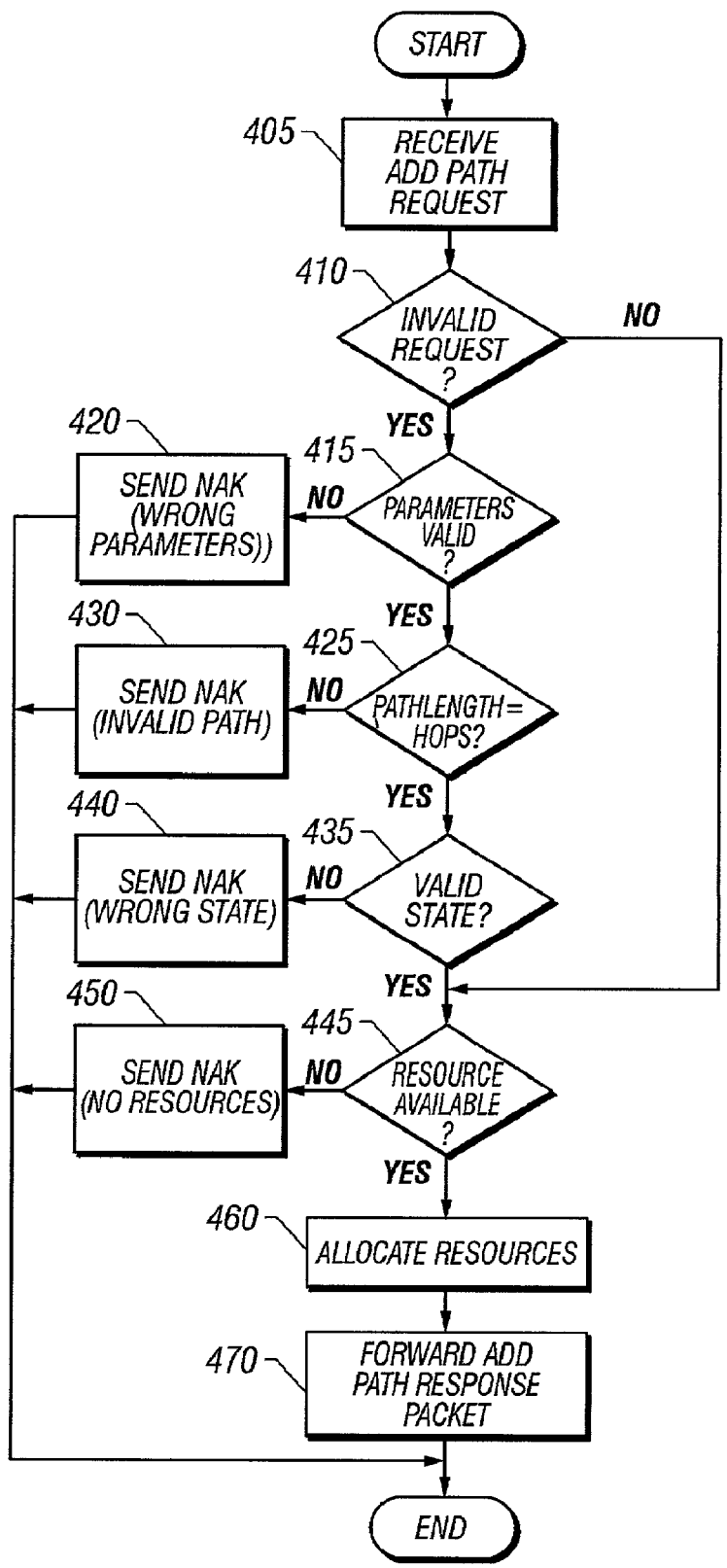
FIG. 4 illustrates a flow chart of steps performed by a destination node when processing an Add Path Request.

FIG. 4 is a flow chart illustrating the actions performed by a destination node when the destination node receives an APR packet. Initially, the destination node receives the APR packet (step 405). The destination node determines if the request is invalid and contains errors (step 410). If the request is valid, the destination node proceeds with resource checking (step 445). If the request contains errors, the destination node determines if one or more of the parameter fields in the APR packet are valid (step 415). These parameters may include bandwidth, type, CoS, and Link IDs and the like. If one or more of the parameters are invalid, the destination node responds with a NAK (WRONG PARAMETERS) upstream (step 420). The destination node determines if the APR packet contains a path length that does not match a hops field of the APR packet (step 425). If the path length does not match the hops field, the destination node sends a NAK (INVALID PATH) (step 430). The destination node determines if the APR packet is received in an invalid path state (i.e., the request arrives while the path is in restoring or deleting states) (step 435). If the APR packet arrives during an invalid path state, the destination node responds with a NAK (WRONG STATE) (step 440).

If no errors are found in the APR packet (step 410), the destination node determines if sufficient resources are available to support the virtual path (step 445). If sufficient resources (such as memory, bandwidth and like) are not available, the destination node responds with a NAK (NO RESOURCES) (step 450). If sufficient resources are available, the destination node allocates resources and makes appropriate connections in a cross-connect matrix for the virtual path (step 460). The destination node reformats an Add Path Response packet with a list of ports assigned to the virtual path and sends the Add Path Response packet upstream (step 470).

Add Path Response Packet

Figure 5:
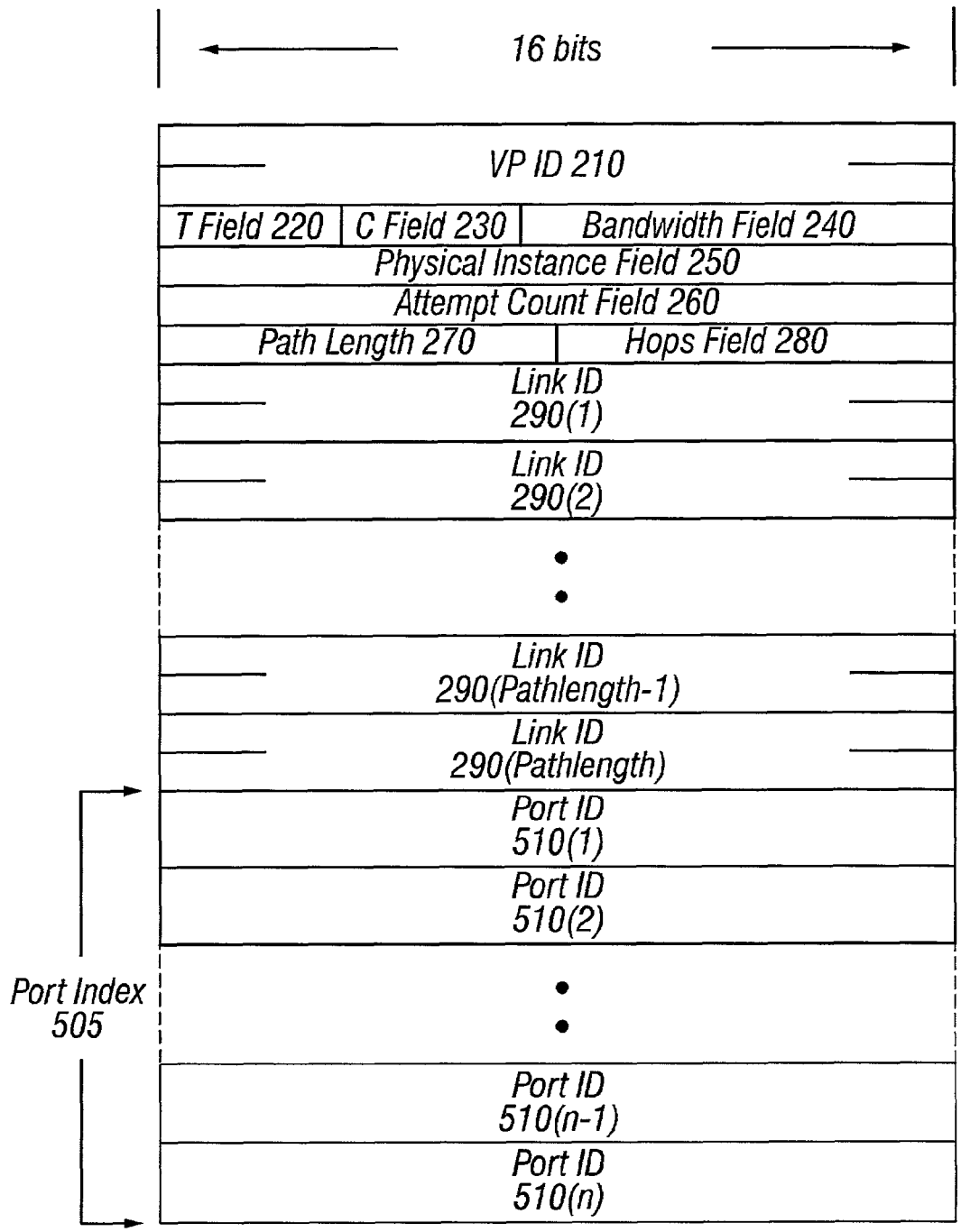
FIG. 5 illustrates an example of Add Path Response packet.

FIG. 5 illustrates an example of an Add Path Response packet ("response packet") 500. The command-specific contents of response packet 500 are similar to those of APR packet 200. In response packet 500, a list of Port IDs 510 is added. Every node that receives response packet 500 adds a list of Port IDs to the packet. These ports are assigned on the upstream link of the node. The Port IDs are local port IDs for the node that is the next node to receive the response packet 500. The number of ports assigned for the VP is same as the number of bandwidth units requested (e.g., in terms of STS-48 granularity).

For positive responses, the responding node copies the contents of the APR packet 200 and appends a port index 505 (e.g., Port IDs 510(1)-(n)) and decrements hops field 280. For negative responses, the responding node copies the contents of the APR packet and instead of a list of assigned Port IDs, the node appends a reason code for rejection in place of port index 505 and decrements hops field 280.

Receiving Add Path Response Packet at the Source Node

Figure 6A:
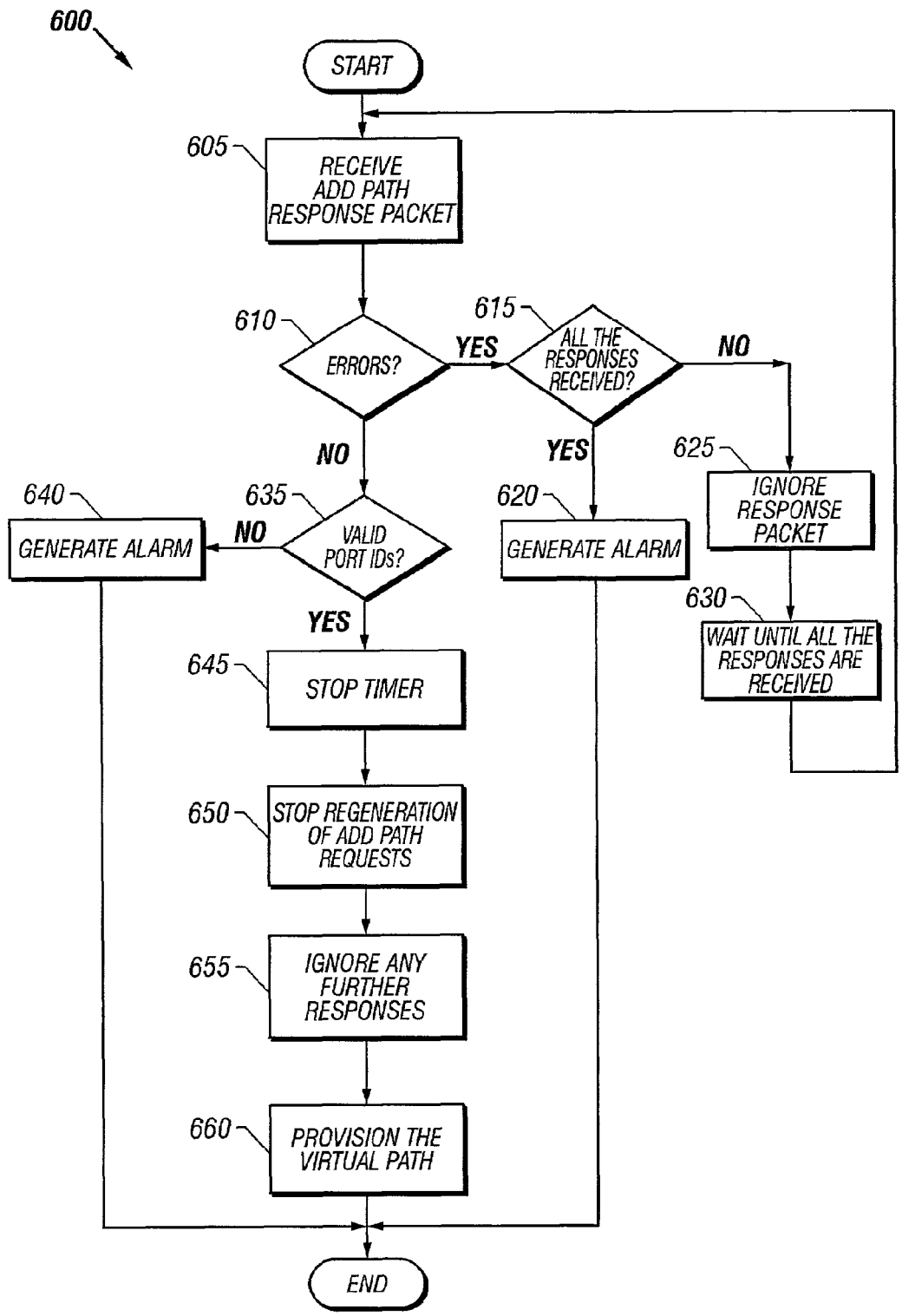
FIG. 6A is a flow chart illustrating the actions performed by a source node when the source node receives a response packet.

FIG. 6A is a flow chart illustrating the actions performed by a source node when the source node receives a response packet. Initially the node receives the response packet (step 605). The source node determines if the response packet contains any errors (step 610). If the response packet contains any error (i.e., the response is a negative response), the source node determines if responses from all previously generated APR packets have been received (step 615). If the responses from all previously generated APR packets have been received, the source node generates a network alarm (step 620). If the responses from all previously generated APR packets have not been received, the source node ignores the response and takes no action (step 625). The source node waits until the all the responses from previously generated APR packets have been received (step 630).

If no errors are indicated in the response packet (i.e., the response is a positive response), the source node determines if the port index in the response packet contains valid Port IDs (step 635). If the port index contains one or more invalid port IDs, the source node generates a network alarm (step 640). If the port IDs in the port index are valid, the source node terminates any timer the source node had to monitor the response time (step 645). The source node stops generating new APRs (step 650). The source node ignores any further response from previously generated APR packets (step 655). The source node restores the virtual path by provisioning the virtual path on the ports allocated by the tandem nodes and the destination node (step 660).

Receiving Add Path Response Packet at the Tandem Node

Figure 6B:
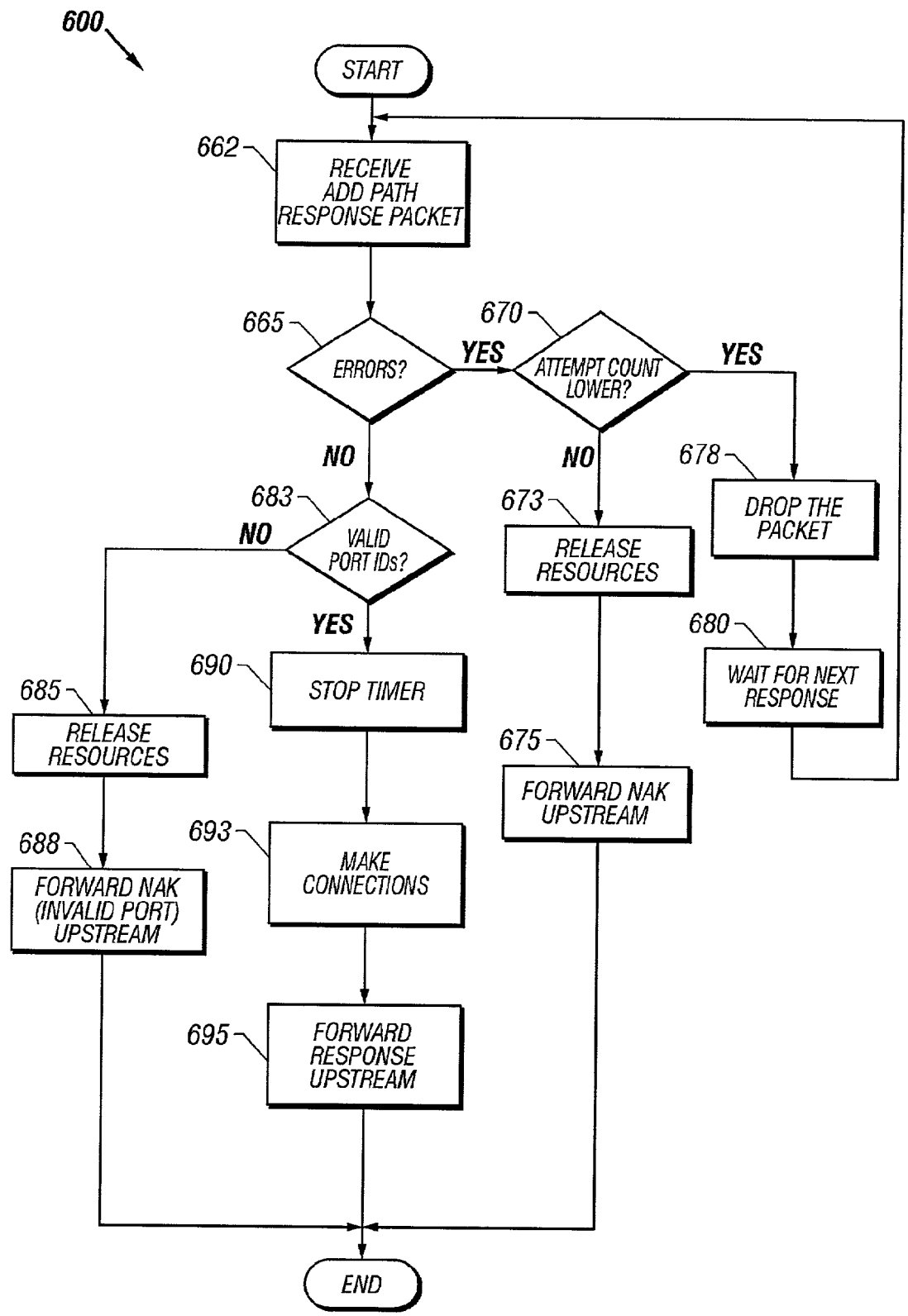
FIG. 6B is a flow chart illustrating the actions performed by a tandem node when the tandem node receives a response packet.

FIG. 6B is a flow chart illustrating the actions performed by a tandem node when the tandem node receives a response packet. Initially the tandem node receives the response packet (step 662). The tandem node determines if the response packet contains any errors (step 665). If the response packet contains any error (i.e., the response is a negative response), the tandem node determines if the attempt count field of the response packet is lower than the attempt count field of the last APR packet forwarded by the tandem node (step 670). If the attempt count field of the response packet is higher than the attempt count field of the last APR packet forwarded by the tandem node, the tandem node releases the resources allocated to the VP (step 673). The tandem node forwards a negative response upstream (step 675). If the attempt count field of the response packet is lower than the attempt count field of the last APR packet forwarded by the tandem node, the tandem node drops the response packet and takes no action (step 678). The tandem node drops the packet because the tandem node may, in future, receive a response packet with no errors (i.e., a positive response) to a later-forwarded APR packet. The tandem node waits for next response packet (step 680).

If the response packet contains no errors, the tandem node determines if the port index in the response packet contains valid port IDs (step 683). If the port index in the response packet contains one or more invalid port IDs, the tandem node releases the resources allocated to the VP (step 685). The tandem node forwards a negative response, NAK (INVALID PORT), upstream (step 688). If the port IDs in the response packet are valid, the tandem node terminates any timer the tandem node had to monitor the response time (step 690). The tandem node makes appropriate connections in the cross-connect matrix (step 693). After making the connections, the tandem node forwards the response packet to next node in the VP (step 695).

An Example of Path Restoration Using Dynamic Unicast Method

The following description is intended to be illustrative of the invention and should not be taken to be limiting. Other embodiments within the scope of the present invention are possible.

Figure 7:
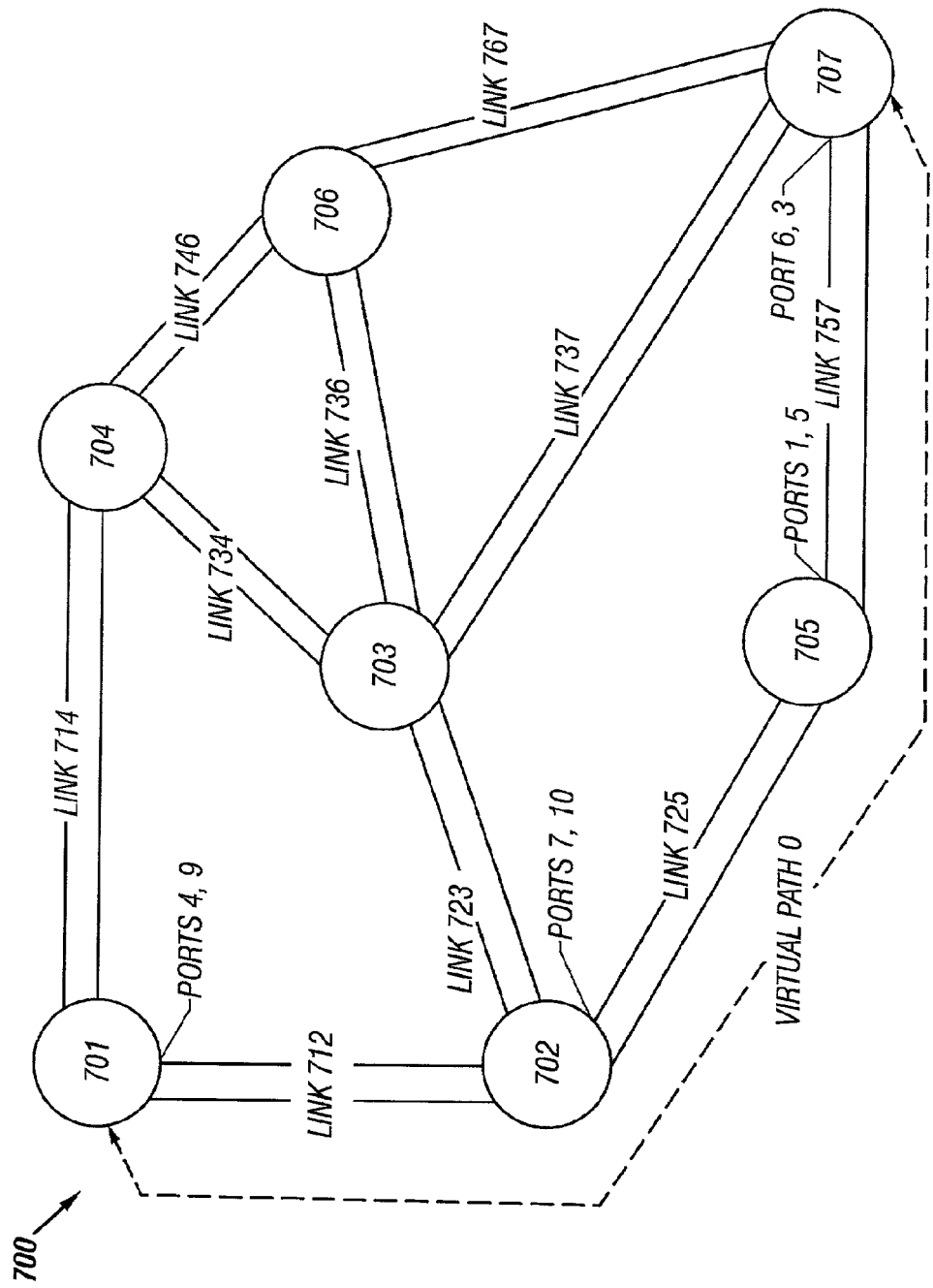
FIG. 7 illustrates an example of a virtual path restoration in a network

FIG. 7 illustrates an example network 700 in which a VP fails and then is restored. Network 700 comprises seven nodes, nodes 701-707. Each node is connected to an adjacent node by an optical link. Each optical link includes multiple physical ports. The failed VP (VP 0) is restored by provisioning VP 0 over nodes 701, 702, 705 and 707 using links 712, 725, and 757. Node 701 is the source (or origin) node of VP 0 and node 707 is the destination (or target node) of VP 0. Node 701 (the source node) generates and sends an APR packet to restore VP 0 starting at node 701 and ending at node 707.

Add Path Request Packet Flow

In the present example, the configuration requires that the path through nodes 702 and 705 be considered to restore VP 0. Node 701 (the source node) generates an APR packet that traverses through nodes 702 and 705 to reach node 707 (the destination node). Node 701 sets the path length field to three to indicate the number of hops to be traversed by the APR packet. Node 701 updates the path field by adding link 712 to the list. Link 712 is used to send the APR packet to node 702. Node 701 sends the APR packet to node 702. Node 702 increments the hops field (e.g., by 1) to indicate the number of hops traversed by the APR packet and adds the next link ID, link 725, in the path field and forwards the APR Packet to node 705. Node 705 adds link ID, link 757, in the path field, increments the hops field (e.g., by 1) and forwards the APR packet to node 707, the destination node. Table 1 shows the values of some of the fields in the APR packet at each node.

TABLE 1

Some of the field values for the APR packet.

| Packet Flow | Path Length field value | Hops field value | Path field value |
|---|---|---|---|
| Node 701 → 702 | 3 | 0 | Link 712 |
| Node 702 → 705 | 3 | 1 | Link 725 |
| Node 705 → 707 | 3 | 2 | Link 757 |

Add Path Response Packet Flow

Node 707 determines from the APR packet header that node 707 is the target (destination) node for the APR packet.

Node 707 generates a response packet and copies the contents of APR packet to the response packet and decrements the hops field. Node 707 allocates one or more ports for VP 0 and appends the remote port ID of each allocated port to the port index field of the response packet. The remote port ID of allocated port at node 707 is the local ID of that port at node 705. For example, node 707 allocates ports with local IDs 6 and 3 to VP 0. However, port 6 at node 707 is recognized as port 1 by node 705 and port 3 at node 707 is recognized as port 5 by node 705. Thus, for local port 6 at node 707, the remote port ID is 1 and for local port 3 at node 707, the remote port ID is 5. By appending remote port IDs of corresponding local ports to the response packet, node 707 indicates which ports should be allocated by node 705. Each node exchanges the information regarding the remote IDs of local ports during a periodic network topology update process. The port list in the response packet is updated at every hop along the path to the source node. Table 2 shows the values of some of the fields in the response packet at each node.

TABLE 2

Some of the field values for response packet.

| Packet Flow | Path Length field value | Hops field value | Path field value | Port Index value |
|---|---|---|---|---|
| Node 707 → 705 | 3 | 2 | Link 757 | 1, 5 |
| Node 705 → 702 | 3 | 1 | Link 725 | 7, 10 |
| Node 702 → 701 | 3 | 0 | Link 712 | 4, 9 |

After receiving the response packet, node 701 (the source node) provisions VP 0 to the new physical path including links 712, 725 and 757. The new physical path for VP 0 uses ports 4 and 9 on link 712 at node 701, ports 7 and 10 on link 725 at node 702, ports 1 and 5 on link 757 at node 705 and corresponding ports 6 and 3 at node 707. The network topology at each node is updated to reflect the new physical path for VP 0.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
   identifying a plurality of nodes with resources, wherein said nodes with resources are comprised in an optical network and have a resource necessary to support a virtual path, wherein said identifying said plurality of nodes with resources comprises
      in response to detecting a failure in said virtual path, forwarding a resource request to an adjacent node,
      waiting for a predefined time for a response to said resource request,
      if said response to said resource request is not received within said predefined time, initiating a subsequent failure measure, wherein said initiating a subsequent failure measure comprises generating a network alarm, and
      receiving, from a candidate node, information indicating that said candidate node has sufficient resources available to support said virtual path, wherein said candidate node is configured to determine whether said candidate node has sufficient resources available to support said virtual path; and
   identifying, based at least in part on said identifying said plurality of nodes with resources, an alternate physical path, said alternate physical path comprising ones of said nodes with resources.

2. The method of claim 1, comprising:
   restoring said virtual path using said alternate physical path.

3. The method of claim 2, wherein said restoring is done by configuring said alternate physical path by establishing a communication connection between said ones of said nodes with resources; and
   provisioning said virtual path over said alternate physical path.

4. The method of claim 2, comprising:
   detecting said failure in said virtual path; wherein
   said detection of said failure is done by receiving a failure message;
   said virtual path is provisioned on a physical path between a first and a second node of said optical network;
   said optical network comprises nodes, and said nodes comprise said nodes with resources;
   each one of said nodes is coupled to at least one other of said nodes by a plurality of optical links;
   said physical path between said first and said second node comprises a plurality of intermediate nodes; and
   each one of said nodes is coupled to at least one other of said nodes in a mesh topology.

5. The method of claim 4, wherein said restoring of said virtual path is completed in less than 2 seconds.

6. The method of claim 4, wherein said restoring of said virtual path is completed in less than 250 milliseconds.

7. The method of claim 4, wherein said first node receives said failure message.

8. The method of claim 7, comprising:
   (i) changing a state of said virtual path to restoring;
   (ii) identifying an adjacent node with required bandwidth for said virtual path;
   (iii) forwarding a resource request packet to said adjacent node with required bandwidth for said virtual path;
   (iv) waiting for a resource response packet for a predetermined time interval; and
   if said resource response packet is not received within said predetermined time interval, repeating steps (ii)-(iv) for a predefined threshold time.

9. The method of claim 8, comprising:
   if said resource response packet is not received within said predefined threshold time, generating a network alarm.

10. The method of claim 9, wherein said predetermined time interval and predefined threshold time are dynamically calculated by said network.

11. The method of claim 8, comprising:
    if said resource response packet is received with at least one error, waiting until responses to all resource request packets are received; and
    if said resource response packet is received with no errors, determining if a list of allocated ports in said resource response packet is valid.

12. The method of claim 11, comprising:
    if said list of allocated port is valid, provisioning said virtual path on said allocated ports; and
    if said list of allocated ports is invalid, generating a network alarm.

13. The method of claim 11, comprising:
    if responses to all resource request packets are received with at least one error, generating a network alarm.

14. The method of claim 8, wherein one of said intermediate nodes receives said resource request packet.

15. The method of claim 14, comprising:
if said resource request packet includes at least one error,
copying said resource request packet to a first resource response packet,
decrementing a hop count field in said first resource response packet,
adding an error code to said first resource response packet, and
responding with said first resource response packet; and
if said resource request packet includes no errors,
allocating a resource to said virtual path,
incrementing a hop count field in said resource request packet,
forwarding said resource request packet to an adjacent node having a resource necessary to support said virtual path, and
waiting for a second resource response packet from said adjacent node.

16. The method of claim 15, comprising:
if said second resource response packet is not received within a second predetermined time interval,
releasing said resource allocated to said virtual path, and
forwarding a negative acknowledgment to said first node.

17. The method of claim 15, comprising:
if said second resource response packet is received with at least one error,
releasing said resource allocated to said virtual path,
decrementing a hop count field in said second resource response packet, and
forwarding said second resource response packet to said first node; and
if said second resource response packet is received with no errors,
determining if said second resource response packet includes a valid list of a plurality of ports.

18. The method of claim 17, comprising:
if said list of said plurality of ports is invalid,
releasing resources allocated to said virtual path, and
forwarding a negative acknowledgement to said first node;
if said list of said plurality of ports is valid,
determining if said plurality of ports is available;
if said plurality of ports is available,
assigning said plurality of ports to said virtual path, and
updating said virtual path information in a node database;
if said plurality of ports is not available,
adding an error code to said second resource response packet;
decrementing a hop count field in said second resource response packet; and
forwarding said second resource response packet to said first node.

19. The method of claim 14, comprising:
if a state of said virtual path is one of 'restoring' and 'deleting',
copying said resource request packet to said first resource response packet,
decrementing said hop count field in said first resource response packet,
adding an error code of to said first resource response packet, and
responding with said first resource response packet.

20. The method of claim 8, wherein said second node receives said resource request packet.

21. The method of claim 20, comprising:
if said resource request packet includes invalid information,
copying said resource request packet to a third resource response packet,
decrementing a hop count field in said third resource response packet,
adding an error code to said third resource response packet, and
responding with said third resource response packet; and
if said resource request packet includes valid information,
determining if a resource is available for said virtual path.

22. The method of claim 21, comprising:
if said resource is available for said virtual path,
copying said resource request packet to said third resource response packet,
allocating said resource to said virtual path,
updating said virtual path information in a node database,
decrementing a hop count field in said third resource response packet,
adding a list of a plurality of ports to said third resource response packet, and
responding with said third resource response packet.

23. The method of claim 21, comprising:
if said resource is not available for said virtual path,
copying said resource request packet to said third resource response packet,
decrementing said hop count field in said third resource response packet,
adding an error code to said third resource response packet, and
responding with said third resource response packet.

24. The method of claim 20, comprising:
if a state of said virtual path is one of 'restoring' and 'deleting',
copying said resource request packet to said third resource response packet,
decrementing said hop count field in said third resource response packet,
adding an error code to said third resource response packet, and
responding with said third resource response packet.

25. The method of claim 4, wherein one of said intermediate nodes receives said failure message.

26. The method of claim 25, comprising:
changing a state of said virtual path to down;
forwarding said failure message to adjacent nodes comprising said virtual path;
initiating a timer for receiving a response to said forwarded failure message;
if said timer expires before said response to said forwarded failure message is received, releasing resources of said virtual path; and
if said response to said forwarded failure message is received before said timer expires,
stopping said timer, and
releasing resources of said virtual path.

27. The method of claim 4, wherein said second node receives said failure message.

28. The method of claim 27, comprising:
acknowledging said failure message;
changing a state of said virtual path to down; and
releasing resources of said virtual path.

29. The method of claim 1, wherein said identifying said plurality of nodes with resources comprises determining whether a node under consideration would be appropriate for use in restoring said virtual path by virtue of having sufficient resources available to support a physical path to be used by said virtual path.

30. The method of claim 29, wherein said resources comprise an available bandwidth.

31. The method of claim 29, wherein said resources comprise an available port.

32. The method of claim 29, wherein said resources comprise an available class of service.

33. The method of claim 1, wherein said identifying said plurality of nodes with resources comprises rejecting a candidate node if said candidate node does not have sufficient resources available to support said virtual path.

34. The method of claim 1, wherein said identifying said alternate physical path comprises:
identifying said alternate physical path based at least in part on a list of allocated ports received from said candidate node.

35. A network element comprising:
a processor configured to restore a virtual path in an optical network;
a memory coupled to said processor; and
a network interface coupled to said processor; wherein
said processor is configured to
receive, from a candidate node, an indication that said candidate node has sufficient resources available to support said virtual path, and
identify, based at least in part on said received indication, a plurality of nodes with resources,
said candidate node is configured to, in response to detecting a failure in said virtual path, forward a resource request to an adjacent node,
said candidate node is configured to wait for a predefined time for a response to said resource request,
said candidate node is configured to, if said response to said resource request is not received within said predefined time, initiate a subsequent failure measure, wherein
said subsequent failure measure comprises a network alarm,
said candidate node is configured to determine whether said candidate node has said sufficient resources available to support said virtual path,
said nodes with resources are comprised in said optical network and have a resource necessary to support said virtual path, and
said processor is configured to identify, based at least in part on identifying said plurality of nodes with resources, an alternate physical path, said alternate physical path comprising ones of said nodes with resources.

36. The network element of claim 35, wherein said processor is configured to
restore said virtual path using said alternate physical path.

37. The network element of claim 35, wherein said processor is configured to
configure said alternate physical path by establishing a communication connection between said ones of said nodes with resources; and
provision said virtual path over said alternate physical path.

38. The network element of claim 35, wherein said processor is configured to
detect said failure in said virtual path; wherein
said detection of said failure is done by receiving a failure message;
said virtual path is provisioned on a physical path between a first and a second node of said optical network;
said optical network comprises nodes, and said nodes comprise said nodes with resources;
each one of said nodes is coupled to at least one other of said nodes by a plurality of optical links;
said physical path between said first and said second node comprises a plurality of intermediate nodes; and
each one of said nodes is coupled to at least one other of said nodes in a mesh topology.

39. The network element of claim 38, wherein said processor is configured to restore said virtual path in less than 2 seconds.

40. The network element of claim 38, wherein said processor is configured to restore said virtual path in less than 250 milliseconds.

41. The network element of claim 38, wherein
said network element is configured as said first node; and
said network element is configured to receive said failure message.

42. The network element of claim 41, wherein said processor is configured to
(i) change a state of said virtual path to restoring;
(ii) identify an adjacent node with required bandwidth for said virtual path;
(iii) forward a resource request packet to said adjacent node with required bandwidth for said virtual path;
(iv) wait for a resource response packet for a predetermined time interval; and
(v) if said resource response packet is not received within said predetermined time interval, repeat steps (ii)-(iv) for a predefined threshold time.

43. The network element of claim 42, wherein said processor is configured to
if said resource response packet is not received within said predefined threshold time, generate a network alarm.

44. The network element of claim 42, wherein said processor is configured to
if said resource response packet is received with at least one error,
wait until responses to all resource request packets are received; and
if said resource response packet is received with no errors,
determine if a list of allocated ports in said resource response packet is valid.

45. The network element of claim 44, wherein said processor is configured to
if said list of allocated port is valid,
provision said virtual path on said allocated ports; and
if said list of allocated ports is invalid,
generate a network alarm.

46. The network element of claim 45, wherein said predetermined time interval and predefined threshold time are dynamically calculated by said network.

47. The network element of claim 44, wherein said processor is configured to
if responses to all resource request packets are received with at least one error,
generate a network alarm.

48. The network element of claim 42, wherein
said network element is configured as one of said intermediate nodes, and
said network element receives said resource request packet.

49. The network element of claim 48, wherein said processor is configured to
if said resource request packet includes at least one error,
copy said resource request packet to a first resource response packet,
decrement a hop count field in said first resource response packet,
add an error code to said first resource response packet, and
respond with said first resource response packet; and
if said resource request packet includes no errors,
allocate a resource to said virtual path,
increment a hop count field in said resource request packet,
forward said resource request packet to an adjacent node having a resource necessary to support said virtual path, and
wait for a second resource response packet from said adjacent node.

50. The network element of claim 49, wherein said processor is configured to
if said second resource response packet is not received within a second predetermined
time interval,
release said resource allocated to said virtual path, and
forward a negative acknowledgment to said first node.

51. The network element of claim 49, wherein said processor is configured to
if said second resource response packet is received with at least one error,
release said resources allocated to said virtual path,
decrement a hop count field in said second resource response packet, and
forward said second resource response packet to said first node; and
if said second resource response packet is received with no errors,
determine if said second resource response packet includes a valid list of a
plurality of ports.

52. The network element of claim 51, wherein said processor is configured to
if said list of said plurality of ports is invalid,
release resources allocated to said virtual path, and
forward a negative acknowledgement to said first node;
if said list of said plurality of ports is valid,
determine if said plurality of ports is available;
if said plurality of ports is available,
assign said plurality of ports to said virtual path, and
update said virtual path information in a node database;
if said plurality of ports is not available,
add an error code to said second resource response packet;
decrement a hop count field in said second resource response packet; and
forward said second resource response packet to said first node.

53. The network element of claim 48, wherein said processor is configured to
if a state of said virtual path is one of 'restoring' and 'deleting',
copy said resource request packet to said first resource response packet,
decrement said hop count field in said first resource response packet,
add an error code of to said first resource response packet, and
respond with said first resource response packet.

54. The network element of claim 42, wherein
said network element is configured as said second node, and
said network element is configured to receive said resource request packet.

55. The network element of claim 54, wherein said processor is configured to
if said resource request packet includes invalid information,
copy said resource request packet to a third resource response packet,
decrement a hop count field in said third resource response packet,
add an error code to said third resource response packet, and
respond with said third resource response packet; and
if said resource request packet includes valid information,
determine if a resource is available for said virtual path.

56. The network element of claim 55, wherein said processor is configured to
if said resource is available for said virtual path,
copy said resource request packet to said third resource response packet,
allocate said resource to said virtual path,
update said virtual path information in a node database,
decrement a hop count field in said third resource response packet,
add a list of a plurality of ports to said third resource response packet, and
respond with said third resource response packet.

57. The network element of claim 55, wherein said processor is configured to
if said resource is not available for said virtual path,
copy said resource request packet to said third resource response packet,
decrement said hop count field in said third resource response packet,
add an error code to said third resource response packet, and
respond with said third resource response packet.

58. The network element of claim 54, wherein said processor is configured to
if a state of said virtual path is one of 'restoring' and 'deleting',
copy said resource request packet to said third resource response packet,
decrement said hop count field in said third resource response packet,
add an error code to said third resource response packet, and
respond with said third resource response packet.

59. The network element of claim 38, wherein
said network element is configured as one of said intermediate nodes, and
said network element is configured to receive said failure message.

60. The network element of claim 59, wherein said processor is configured to
change a state of said virtual path to down;
forward said failure message to adjacent nodes comprising said virtual path;
initiate a timer for receiving a response to said forwarded failure message;
if said timer expires before said response to said forwarded failure message is received,
release resources of said virtual path; and
if said response to said forwarded failure message is received before said timer expires,
stop said timer, and
release resources of said virtual path.

61. The network element of claim 38, wherein
said network element is configured as said second node, and
said network element receives said failure message.

62. The network element of claim 61, wherein said processor is configured to
acknowledge said failure message;
change a state of said virtual path to down; and
release resources of said virtual path.

63. The network element of claim 35, wherein said processor is configured to:
identify said alternate physical path based at least in part on a list of allocated ports received from said candidate node.

64. A computer system comprising:
means for identifying a plurality of nodes with resources, wherein said nodes with resources are comprised in an optical network and have a resource necessary to support a virtual path, said means for identifying said plurality of nodes with resources comprising
means for, in response to detecting a failure in said virtual path, forwarding a resource request to an adjacent node,
means for waiting for a predefined time for a response to said resource request,
means for, if said response to said resource request is not received within said predefined time, initiating a subsequent failure measure, wherein said subsequent failure measure comprises a network alarm, and
means for receiving, from a candidate node, information indicating that said candidate node has sufficient resources available to support said virtual path, wherein
said candidate node is configured to determine whether said candidate node has sufficient resources available to support said virtual path; and
means for identifying, based at least in part on said identifying said plurality of nodes with resources, an alternate physical path, said alternate physical path comprising ones of said nodes with resources.

65. The computer system of claim 64, comprising:
means for restoring said virtual path using said alternate physical path.

66. The computer system of claim 65, comprising:
means for detecting said failure in said virtual path; wherein
said detection of said failure is done by receiving a failure message;
said virtual path is provisioned on a physical path between a first and a second node of said optical network;
said optical network comprises nodes, and said nodes comprise said nodes with resources;
each one of said nodes is coupled to at least one other of said nodes by a plurality of optical links;
said physical path between said first and said second node comprises a plurality of intermediate nodes; and
each one of said nodes is coupled to at least one other of said nodes in a mesh topology.

67. The computer system of claim 66, wherein said restoring of said virtual path is completed in less than 2 seconds.

68. The computer system of claim 66, wherein said restoring of said virtual path is completed in less than 250 milliseconds.

69. The computer system of claim 66, wherein said first node receives said failure message.

70. The computer system of claim 69, comprising:
(i) means for changing a state of said virtual path to restoring;
(ii) means for identifying an adjacent node with required bandwidth for said virtual path;
(iii) means for forwarding a resource request packet to said adjacent node with required bandwidth for said virtual path;
(iv) means for waiting for a resource response packet for a predetermined time interval; and
means for repeating actions of said means (ii)-(iv) for a predefined threshold time if said resource response packet is not received within said predetermined time interval.

71. The computer system of claim 70, comprising:
means for generating a network alarm if said resource response packet is not received within said predefined threshold time.

72. The computer system of claim 71, wherein said predetermined time interval and predefined threshold time are dynamically calculated by said network.

73. The computer system of claim 70, comprising:
means for waiting until responses to all resource request packets are received if said resource response packet is received with at least one error; and
means for determining if a list of allocated ports in said resource response packet is valid if said resource response packet is received with no errors.

74. The computer system of claim 73, comprising:
means for provisioning said virtual path on said allocated ports if said list of allocated port is valid; and
means for generating a network alarm if said list of allocated ports is invalid.

75. The computer system of claim 73, comprising:
means for generating a network alarm if responses to all resource request packets are received with at least one error.

76. The computer system of claim 70, wherein one of said intermediate nodes receives said resource request packet.

77. The computer system of claim 76, comprising:
means for copying said resource request packet to a first resource response packet if said resource request packet includes at least one error;
means for decrementing a hop count field in said first resource response packet if said resource request packet includes at least one error;
means for adding an error code to said first resource response packet if said resource request packet includes at least one error;
means for responding with said first resource response packet if said resource request packet includes at least one error;
means for allocating a resource to said virtual path if said resource request packet includes no errors;

means for incrementing a hop count field in said resource request packet if said resource request packet includes no errors;
means for forwarding said resource request packet to an adjacent node having a resource necessary to support said virtual path if said resource request packet includes no errors; and
means for waiting for a second resource response packet from said adjacent node if said resource request packet includes no errors.

78. The computer system of claim 77, comprising:
means for releasing said resource allocated to said virtual path if said second resource response packet is not received within a second predetermined time interval; and
means for forwarding a negative acknowledgment to said first node if said second resource response packet is not received within said second predetermined time interval.

79. The computer system of claim 77, comprising:
means for releasing said resources allocated to said virtual path if said second resource response packet is received with at least one error;
means for decrementing a hop count field in said second resource response packet if said second resource response packet is received with at least one error;
means for forwarding said second resource response packet to said first node if said second resource response packet is received with at least one error; and
means for determining if said second resource response packet includes a valid list of a plurality of ports if said second resource response packet is received with no errors.

80. The computer system of claim 79, comprising:
means for releasing resources allocated to said virtual path if said list of said plurality of ports is invalid;
means for forwarding a negative acknowledgement to said first node if said list of said plurality of ports is invalid;
means for determining if said plurality of ports is available if said list of said plurality of ports is valid;
means for assigning said plurality of ports to said virtual path if said plurality of ports is available;
means for updating said virtual path information in a node database if said plurality of ports is available;
means for adding an error code to said second resource response packet if said plurality of ports is not available;
means for decrementing a hop count field in said second resource response packet; and
means for forwarding said second resource response packet to said first node.

81. The computer system of claim 76, comprising:
means for copying said resource request packet to said first resource response packet if a state of said virtual path is one of 'restoring' and 'deleting';
means for decrementing said hop count field in said first resource response packet if a state of said virtual path is one of 'restoring' and 'deleting';
means for adding an error code of to said first resource response packet if a state of said virtual path is one of 'restoring' and 'deleting'; and
means for responding with said first resource response packet if a state of said virtual path is one of 'restoring' and 'deleting'.

82. The computer system of claim 70, wherein said second node receives said resource request packet.

83. The computer system of claim 82, comprising:
means for copying said resource request packet to a third resource response packet if said resource request packet includes invalid information;
means for decrementing a hop count field in said third resource response packet if said resource request packet includes invalid information;
means for adding an error code to said third resource response packet if said resource request packet includes invalid information;
means for responding with said third resource response packet if said resource request packet includes invalid information; and
means for determining if a resource is available for said virtual path if said resource request packet includes valid information.

84. The computer system of claim 83, comprising:
means for copying said resource request packet to said third resource response packet if said resource is available for said virtual path;
means for allocating said resource to said virtual path if said resource is available for said virtual path;
means for updating said virtual path information in a node database if said resource is available for said virtual path;
means for decrementing a hop count field in said third resource response packet if said resource is available for said virtual path;
means for adding a list of a plurality of ports to said third resource response packet if said resource is available for said virtual path; and
means for responding with said third resource response packet.

85. The computer system of claim 83, comprising:
means for copying said resource request packet to said third resource response packet if said resource is not available for said virtual path;
means for decrementing said hop count field in said third resource response packet if said resource is not available for said virtual path;
means for adding an error code to said third resource response packet if said resource is not available for said virtual path; and
means for responding with said third resource response packet.

86. The computer system of claim 82, comprising:
means for copying said resource request packet to said third resource response packet if a state of said virtual path is one of 'restoring' and 'deleting';
means for decrementing said hop count field in said third resource response packet if a state of said virtual path is one of 'restoring' and 'deleting';
means for adding an error code to said third resource response packet if a state of said virtual path is one of 'restoring' and 'deleting'; and
means for responding with said third resource response packet.

87. The computer system of claim 66, wherein one of said intermediate nodes receives said failure message.

88. The computer system of claim 87, comprising:
means for changing a state of said virtual path to down;
means for forwarding said failure message to adjacent nodes comprising said virtual path;
means for initiating a timer for receiving a response to said forwarded failure message;

means for releasing resources of said virtual path if said timer expires before said response to said forwarded failure message is received;

means for stopping said timer if said response to said forwarded failure message is received before said timer expires; and means for releasing resources of said virtual path if said response to said forwarded failure message is received before said timer expires.

89. The computer system of claim 66, wherein said second node receives said failure message.

90. The computer system of claim 89, comprising:
means for acknowledging said failure message;
means for changing a state of said virtual path to down; and
means for releasing resources of said virtual path.

91. The computer system of claim 64, wherein said means for restoring comprises:
means for configuring said alternate physical path by establishing a communication connection between said ones of said nodes with resources; and
means for provisioning said virtual path over said alternate physical path.

92. The computer system of claim 64, wherein said means for identifying a plurality of nodes with resources is comprised in said candidate node.

93. The computer system of claim 64, wherein said means for identifying said alternate physical path is configured to identify said alternate physical path based at least in part on a list of allocated ports received from said candidate node.

94. A computer program product encoded in computer readable storage media, said program product comprising a set of instructions executable on a computer system, said set of instructions configured to cause said computer system to
receive, from a candidate node, an indication that said candidate node has sufficient resources available to support said virtual path;
identify, based at least in part on said indication, a plurality of nodes with resources, wherein
said candidate node is configured to, in response to detecting a failure in said virtual path, forward a resource request to an adjacent node,
said candidate node is configured to wait for a predefined time for a response to said resource request,
said candidate node is configured to, if said response to said resource request is not received within said predefined time, initiate a subsequent failure measure, wherein
said subsequent failure measure comprises a network alarm,
said candidate node is configured to determine whether said candidate node has said sufficient resources available to support said virtual path,
said nodes with resources are comprised in an optical network and have a resource necessary to support a virtual path; and
identify, based at least in part on identifying said plurality of nodes with resources, an alternate physical path, said alternate physical path comprising ones of said nodes with resources.

95. The computer program product of claim 94, wherein said set of instructions is configured to
restore said virtual path using said alternate physical path.

96. The computer program product of claim 94, wherein said set of instructions is configured to
configure said alternate physical path by establishing a communication connection between said ones of said nodes with resources; and
provision said virtual path over said alternate physical path.

97. The computer program product of claim 94, wherein said set of instructions is configured to
detect said failure in said virtual path; wherein
said detection of said failure is done by receiving a failure message;
said virtual path is provisioned on a physical path between a first and a second node of said optical network;
said optical network comprises nodes, and said nodes comprise said nodes with resources;
each one of said nodes is coupled to at least one other of said nodes by a plurality of optical links;
said physical path between said first and said second node comprises a plurality of intermediate nodes; and
each one of said nodes is coupled to at least one other of said nodes in a mesh topology.

98. The computer program product of claim 97, wherein said set of instructions is configured to restore said virtual path in less than 2 seconds.

99. The computer program product of claim 97, wherein said set of instructions is configured to restore said virtual path in less than 250 milliseconds.

100. The computer program product of claim 97, wherein said first node receives said failure message.

101. The computer program product of claim 100, wherein said set of instructions is configured to
(i) change a state of said virtual path to restoring;
(ii) identify an adjacent node with required bandwidth for said virtual path;
(iii) forward a resource request packet to said adjacent node with required bandwidth for said virtual path;
(iv) wait for a resource response packet for a predetermined time interval; and
(v) if said resource response packet is not received within said predetermined time interval, repeat steps (ii)-(iv) for a predefined threshold time.

102. The computer program product of claim 101, wherein said set of instructions is configured to
if said resource response packet is not received within said predefined threshold time, generate a network alarm.

103. The computer program product of claim 102, wherein said set of instructions is configured to
if responses to all resource request packets are received with at least one error,
generate a network alarm.

104. The computer program product of claim 101, wherein said set of instructions is configured to
if said resource response packet is received with at least one error,
wait until responses to all resource request packets are received; and
if said resource response packet is received with no errors, determine if a list of allocated ports in said resource response packet is valid.

105. The computer program product of claim 104, wherein said set of instructions is configured to
if said list of allocated port is valid,
provision said virtual path on said allocated ports; and
if said list of allocated ports is invalid,
generate a network alarm.

106. The computer program product of claim 101, wherein said predetermined time interval and predefined threshold time are dynamically calculated by said network.

107. The computer program product of claim 101, wherein one of said intermediate nodes receives said resource request packet.

108. The computer program product of claim 107, wherein said set of instructions is configured to
if a state of said virtual path is one of 'restoring' and 'deleting',
copy said resource request packet to said first resource response packet,
decrement said hop count field in said first resource response packet,
add an error code of to said first resource response packet, and
respond with said first resource response packet.

109. The computer program product of claim 101, wherein said set of instructions is configured to
if said resource request packet includes at least one error,
copy said resource request packet to a first resource response packet,
decrement a hop count field in said first resource response packet,
add an error code to said first resource response packet, and
respond with said first resource response packet; and
if said resource request packet includes no errors,
allocate a resource to said virtual path,
increment a hop count field in said resource request packet,
forward said resource request packet to an adjacent node having a resource necessary to support said virtual path, and
wait for a second resource response packet from said adjacent node.

110. The computer program product of claim 109, wherein said set of instructions is configured to
if said second resource response packet is not received within a second predetermined time interval,
release said resource allocated to said virtual path, and
forward a negative acknowledgment to said first node.

111. The computer program product of claim 109, wherein said set of instructions is configured to
if said second resource response packet is received with at least one error,
release said resources allocated to said virtual path,
decrement a hop count field in said second resource response packet, and
forward said second resource response packet to said first node; and
if said second resource response packet is received with no errors,
determine if said second resource response packet includes a valid list of a plurality of ports.

112. The computer program product of claim 111, wherein said set of instructions is configured to
if said list of said plurality of ports is invalid,
release resources allocated to said virtual path, and
forward a negative acknowledgement to said first node;
if said list of said plurality of ports is valid,
determine if said plurality of ports is available;
if said plurality of ports is available,
assign said plurality of ports to said virtual path, and
update said virtual path information in a node database;
if said plurality of ports is not available,
add an error code to said second resource response packet;
decrement a hop count field in said second resource response packet; and
forward said second resource response packet to said first node.

113. The computer program product of claim 101, wherein said second node receives said resource request packet.

114. The computer program product of claim 113, wherein said set of instructions is configured to
if said resource request packet includes invalid information,
copy said resource request packet to a third resource response packet,
decrement a hop count field in said third resource response packet,
add an error code to said third resource response packet, and
respond with said third resource response packet; and
if said resource request packet includes valid information,
determine if a resource is available for said virtual path.

115. The computer program product of claim 114, wherein said set of instructions is configured to
if said resource is available for said virtual path,
copy said resource request packet to said third resource response packet,
allocate said resource to said virtual path,
update said virtual path information in a node database,
decrement a hop count field in said third resource response packet,
add a list of a plurality of ports to said third resource response packet, and
respond with said third resource response packet.

116. The computer program product of claim 113, wherein said set of instructions is configured to
if said resource is not available for said virtual path,
copy said resource request packet to said third resource response packet,
decrement said hop count field in said third resource response packet,
add an error code to said third resource response packet, and
respond with said third resource response packet.

117. The computer program product of claim 113, wherein said set of instructions is configured to
if a state of said virtual path is one of 'restoring' and 'deleting',
copy said resource request packet to said third resource response packet,
decrement said hop count field in said third resource response packet,
add an error code to said third resource response packet, and
respond with said third resource response packet.

118. The computer program product of claim 97, wherein one of said intermediate nodes receives said failure message.

119. The computer program product of claim 97, wherein said set of instructions is configured to
change a state of said virtual path to down;
forward said failure message to adjacent nodes comprising said virtual path;
initiate a timer for receiving a response to said forwarded failure message;
if said timer expires before said response to said forwarded failure message is received,
release resources of said virtual path; and
if said response to said forwarded failure message is received before said timer expires, stop said timer, and
release resources of said virtual path.
120. The computer program product of claim 97, wherein said second node receives said failure message.
121. The computer program product of claim 120, wherein said set of instructions is configured to
acknowledge said failure message;
change a state of said virtual path to down; and
release resources of said virtual path.
122. The computer program product of claim 94, wherein said set of instructions is configured to
identify said alternate physical path based at least in part on a list of allocated ports received from said candidate node.
123. A network element configured to restore a virtual path in an optical network, said network element comprising:
a processor;
a memory coupled to said processor; and
a network interface coupled to said processor; said processor configured to
identify a plurality of nodes with resources, wherein said nodes with resources are comprised in said optical network and have a resource necessary to support said virtual path,
identify an alternate physical path, said alternate physical path comprising ones of said nodes with resources,
detect a failure in said virtual path,
change a state of said virtual path to restoring,
(i) identify an adjacent node with required bandwidth for said virtual path,
(ii) forward a resource request packet to said adjacent node with required bandwidth for said virtual path,
(iii) wait for a resource response packet for a predetermined time interval, and
if said resource response packet is not received within said predetermined time interval, repeat steps (i)-(iii) for a predefined threshold time;
wherein,
said detection of said failure is done by receiving a failure message;
said virtual path is provisioned on a physical path between a first and a second node of said optical network;
said optical network comprises nodes, and said nodes comprise said nodes with resources;
each one of said nodes is coupled to at least one other of said nodes by a plurality of optical links;
said physical path between said first and said second node comprises a plurality of intermediate nodes;
each one of said nodes is coupled to at least one other of said nodes in a mesh topology;
said network element is configured as said first node; and
said network element is configured to receive said failure message.

* * * * *